Nov. 8, 1938. A. L. HOLVEN 2,135,511
METHOD AND APPARATUS FOR INDICATING THE DEGREE
OF SUPERSATURATION OF A BOILING SOLUTION
Filed Nov. 8, 1935 5 Sheets-Sheet 1

INVENTOR
Alfred L. Holven
BY
ATTORNEY.

Nov. 8, 1938.   A. L. HOLVEN   2,135,511
METHOD AND APPARATUS FOR INDICATING THE DEGREE
OF SUPERSATURATION OF A BOILING SOLUTION
Filed Nov. 8, 1935   5 Sheets-Sheet 2

INVENTOR
Alfred L. Holven
BY
ATTORNEY

Nov. 8, 1938.  A. L. HOLVEN  2,135,511
METHOD AND APPARATUS FOR INDICATING THE DEGREE
OF SUPERSATURATION OF A BOILING SOLUTION
Filed Nov. 8, 1935    5 Sheets-Sheet 5

INVENTOR
Alfred L. Holven
BY
Wm. K. Atkinson
ATTORNEY.

Patented Nov. 8, 1938

2,135,511

UNITED STATES PATENT OFFICE 2,135,511

METHOD AND APPARATUS FOR INDICATING THE DEGREE OF SUPERSATURATION OF A BOILING SOLUTION

Alfred L. Holven, Crockett, Calif.

Application November 8, 1935, Serial No. 48,942

30 Claims. (Cl. 73—342)

This invention relates to the measurement as well as to the recording and control of the degree of supersaturation of boiling solutions. More particularly this invention covers means of measuring the supersaturation of sugar solutions and controlling the various factors associated with the evaporation of sugar solutions in vacuum pans, with the object of most efficiently recovering in crystalline form the sugar contained in such solutions.

One object of this invention is to provide a new and novel method by which the degree of supersaturation of boiling sugar solutions can be measured without the necessity of independently measuring or controlling the degree of absolute pressure under which such solutions are being boiled.

Another object of this invention is the provision of means by which a continuous measurement of the supersaturation of boiling sugar solutions can be automatically obtained.

A still further object of this invention is to make automatic measurement and control of the degree of supersaturation of boiling sugar solutions possible by properly compensating for the interfering effect of each of the several variables involved.

Other objects of the invention, not at this time more particularly enumerated, will be understood from the following specifications and claims.

In the crystallization of cane sugar from sugar solutions on an industrial scale, it is desirable in order to avoid the destruction of sugar by overheating, to evaporate the water from the solution at as low a temperature as is practicable. This objective is attained by carrying out the crystallization and concentration of the solution in a special form of evaporator termed a vacuum pan, in which the juices, sugar liquors and syrups may be boiled at a pressure considerably less than atmospheric and where, as is well known, the boiling point of the solution will be correspondingly reduced.

In all cases it is most desirable to so regulate the evaporation in vacuum pans that the proper conditions for the most favorable crystallization of sugar shall prevail. For crystals to form in a sugar solution, and for these crystals to grow, it is essential that the solution become "supersaturated". A solution may be termed saturated with respect to sugar if, when kept at a uniform temperature, it can neither dissolve more sugar nor form more crystalline sugar. If a "saturated" sugar solution be evaporated to a smaller volume while at the same time the temperature is maintained constant, the sugar does not immediately crystallize out but remains in supersaturated solution.

Both the quantity and quality of sugar crystallized from solution are dependent on the maintenance of the proper degree of supersaturation at various stages of the sugar boiling process. An accurate measure of the existing supersaturation, as well as a practicable means of maintaining the optimum degree of supersaturation at all times, are paramount objects of the present invention.

In considering what the supersaturation coefficient represents, if we designate by $S$ the amount of sugar dissolved in one part of water at a definite temperature when the solution is saturated and by $S_1$ that amount which at the same temperature is dissolved in the same amount of water in a supersaturated solution, then the quotient $$\frac{S_1}{S}$$

is called the supersaturation coefficient. This coefficient of supersaturation is a fundamentally important factor in controlling the evaporative processes by which sugar is recovered in crystalline form.

In order to point out more clearly the difference between earlier developments and the present invention, a brief review of the prior art is desirable. One of the earliest instruments to be employed for assisting the control of sugar boiling was the Brasmoscope, which consisted merely of a mercury vacuum gauge and a thermometer. By means of the Brasmoscope, vacuum and boiling temperature could be simultaneously determined. From such observations the boiling point elevations could be determined and, by reference to empirical tables, an approximate measure of the concentration of the solution being evaporated could be obtained. A direct determination of the boiling point elevation without the necessity of calculations became the object of German Patent No. 210,543, issued to Langen in 1909. In Langen's device two opposing thermocouples are employed, one of the thermocouples is placed in the boiling sugar liquor or massecuite while the other is placed in a pilot boiler into which steam is liberated under the same absolute pressure as that prevailing in the vacuum pan. All that was accomplished by either the Brasmoscope or Langen's device was an approximate measure of concentration, and even this was considerably in error, as all such devices were based on the erroneous assumption that the boiling point elevation corresponding to any particular concentration is unaffected by the pressure under which boiling takes place. Furthermore, neither the boiling point elevation nor the concentration of the solution are indicative of the degree of supersaturation, unless proper allowance is made for the absolute pressure under which the solution is boiling. For instance a solution which is exactly saturated at a given absolute pressure will become supersaturated if the pressure decreases or will become under-saturated if the pressure increases. To convert concentration into coefficient of supersaturation, which after all is the characteristic it is desired to measure, requires additional calculations in which the effect of absolute pressure is also taken into account. Owing to their inability to furnish any real measure of supersaturation, neither the Brasmoscope nor Langen's device, nor even the vacuum pan refractometer have received any general application in the sugar industry. Such devices have offered neither a direct method of measuring supersaturation nor any possible means of accurately regulating sugar boiling operations in accordance with the degree of supersaturation of the solution.

One of the principal obstacles which has retarded the development of equipment for the measurement and control of supersaturation in solutions has been that no general relationship has been known by which supersaturation could be expressed as a function of the other variables. Determination of supersaturation therefore involved calculation of this factor by reference to empirically derived tables, a function which no automatic mechanism or instrument could be expected to perform.

As a result of intensive investigation a hitherto unrecognized fact that supersaturation may be calculated by means of a mathematical formula has been discovered. In this formula, the only variables encountered are the boiling point of the sugar liquor and the absolute pressure under which the sugar liquor is boiling. The boiling point and the absolute pressure can both be automatically determined, and investigations further indicate the possibility of correlating these two determinations in a suitable electric circuit to produce as a result not only a measurement of the concentration of solution, but what is more important, a continuous measurement of the coefficient of supersaturation as well. The accuracy with which the supersaturation can be measured as disclosed by this invention, is unaffected by variations in either absolute pressure, boiling temperature, or purity of the sugar liquor, and in such respects the invention of the present disclosure appears to offer distinctive advantages over other methods previously employed. In other words, the present invention offers a distinctly novel means of measuring the degree of supersaturation of sugar solutions by a method whose accuracy is unaffected by changes in the absolute pressure under which the sugar solution is being boiled.

For a clearer understanding of this invention and the novel conceptions on which it is based, reference may be made to the following drawings in which—

The research which culminated in the present invention has disclosed the hitherto unrecognized fact that the supersaturation of a boiling sugar solution may be expressed as a mathematical function of the boiling point of the sugar liquor and the absolute pressure. This function is of such a nature that, at all pressures encountered in sugar boiling practice, a plot of the boiling points of sugar solutions having any given degree of supersaturation against the corresponding boiling points of water at these same pressures yields a substantially straight line.

For the purpose of facilitating an understanding of this invention, there accompanies this description a number of plots or graphic curves which will be referred to as necessity requires. The above statement with respect to the supersaturation of a boiling solution will be evident from inspection of the curves shown in Figures 1, 2, 3 and 4, and particularly Figure 3, which graphically illustrates the new and novel concept, by means of which every degree of supersaturation may be regarded as being part of a line whose slope serves as a definite index of the degree of supersaturation.

Figure 1:
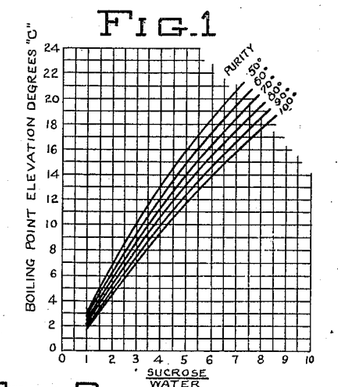
Figure 1 is a graph showing the boiling points at a pressure equivalent to thirty inches (30″) mercury of sugar solutions of various concentrations and purities.

The plot in Figure 1 of the drawings, shows the boiling points of sugar solutions of various purities and concentrations expressed as total solids per unit of water at an absolute pressure equivalent to thirty inches (30″) of mercury.

Figure 2:
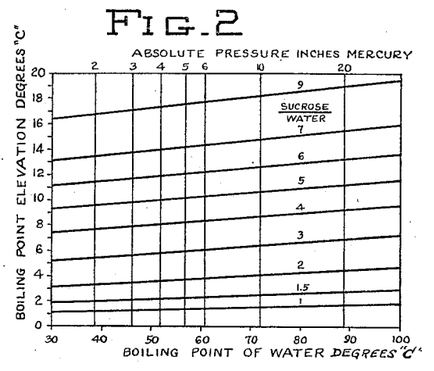
Figure 2 is a graph showing the influence of pressure on the boiling point elevation of sucrose solutions.

The curves illustrated in Figure 2 of the drawings, show the effect of a changing pressure on the boiling point elevation of sugar solutions. By the term boiling point elevation, as used in this sense, is meant the amount by which the temperature of a sugar solution boiling under any particular absolute pressure exceeds the temperature of water boiling under the same absolute pressure. The curves of Figure 4 of the drawings, show the slopes of the constant supersaturation lines for sugar liquors of various purities.

Before proceeding with a description of the means adapted to apply the above discovery to the art of sugar boiling, reference is again made to Figure 3 of the drawings, wherein the slope of the constant supersaturation lines shown may be represented by the formula $$\frac{T_1w - T_2w}{T_1s - T_2s} = \tan. \theta.$$

Figure 3:
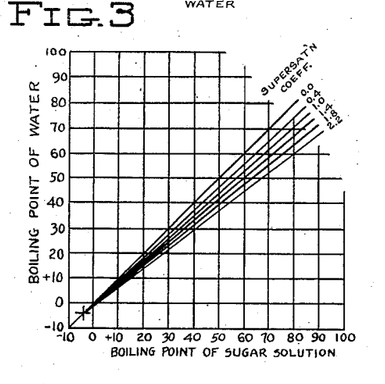
Figure 3 is a graph illustrating the hitherto unrecognized fact that a plot of the boiling points of a sugar solution of any given degree of supersaturation gives a substantially straight line whose slope is a definite index of the degree of supersaturation.
Figure 4:
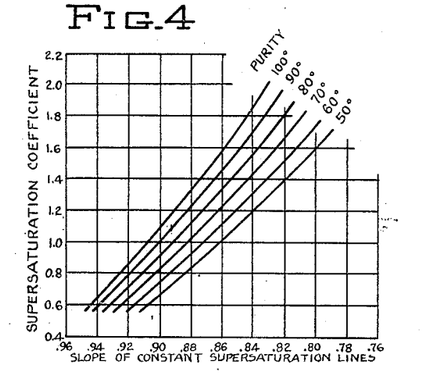
Figure 4 graphically illustrates the slopes of constant supersaturation curves for sugar liquors of various purities.

In this formula $T_1s$ and $T_1w$ are respectively boiling points of the sugar solution and water at one absolute pressure, and $T_2s$ and $T_2w$ are respectively the corresponding boiling points at some other absolute pressure. Tan. $\theta$ is the slope of the corresponding constant supersaturation line. This formula may be further simplified to the form $$\frac{Tw - k}{Ts - k} = \tan. \theta.$$

In this simplified formula $Tw$ and $Ts$ are respectively the boiling points of water and the sugar solution at the same absolute pressure and "$k$" is a reference temperature whose value is determined by the point at which the constant supersaturation line intersects the line representing a supersaturation coefficient of zero. The last mentioned line is identical with the line which represents the boiling points of water at the pressures involved.

Inasmuch as there is but one tan. $\theta$ value corresponding to each degree of supersaturation, it will be seen that means by which said tan. $\theta$ values can be measured will likewise serve as a measure of the supersaturation of the solution and in the present invention it is proposed to use the above disclosed principle as the basis for the herein disclosed novel method of measuring supersaturation values.

Figure 5:
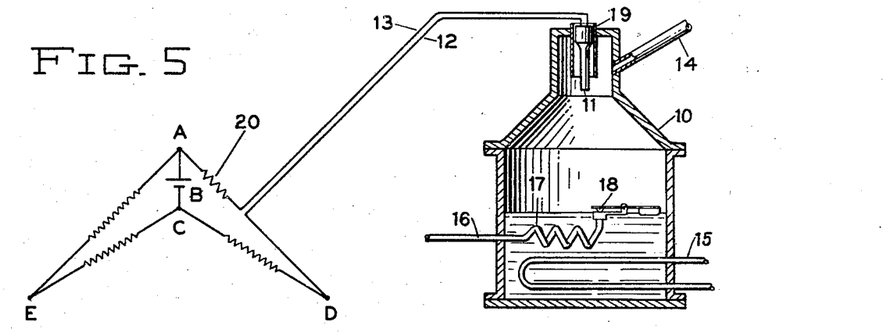
Figure 5 illustrates the principles of a system by which a potential difference proportional to the difference between the boiling point of water or other solvent and a fixed or reference temperature can be obtained.

In Figure 5 of the drawings, there is diagrammatically shown the arrangement chosen for illustration for producing an electrical quantity corresponding to the numerator $Tw-k$ in the above formula, which numerator represents the difference between the boiling point of water and a reference temperature. In this figure of the drawings, the numeral 10 designates a pilot pan in which water is boiled at the same absolute pressure as that prevailing in the vacuum pan where the sugar solution is boiling. Disposed in the pilot pan 10 is a resistance thermometer or other temperature responsive element 11 from which suitable conductors 12 and 13 extend to a suitable circuit, as will hereinafter appear. The pilot pan 10 has an outlet pipe 14 by means of which the vapors generated therein are exhausted. For heating the water in the pan 10 there is a heating element 15. The pilot pan 10 has a water feed pipe 16 which discharges through a coil 17 where the water is preheated before being discharged in the pilot pan. At the discharge end of the feed pipe coil 17 there is a float-operated valve 18 which serves, as will be understood, to maintain a constant level of water in the pilot pan. In order to control the sensitivity of the resistance thermometer or temperature element 11 within the pan 10 sufficiently to reduce its interval of response to correspond with that of a similar thermometer placed in the vacuum pan in which the sugar solution is boiling, there is provided about the resistance thermometer 11 a shield or sleeve 19 which forms a recess into which the thermometer element 11 may be withdrawn. This arrangement will produce a lagging about the resistance element 11 which, depending upon the position of the latter element, will determine the promptness with which it will respond to changes in the temperature of the water boiling in the pilot pan 10.

If the resistance thermometer element 11 is included in one arm of a Wheatstone bridge circuit, as schematically illustrated, the relative magnitudes of the other arms AE, EC and CD can be so adjusted with respect to each other that the potential difference between the points D and E will be proportional to the expression $Tw-k$ for any value of response that the thermometric resistance element 11 may assume. At this point it should be stated that the resistance thermometer element 11 is formed of a metal such as copper, nickel, platinum or other material whose resistance changes by a known amount with changes in temperature, whereas the resistance which comprises the arms AE, EC and CD and a resistance 20 which is in series with the resistance thermometer element 11 are made of manganin or other material having a substantially negligible temperature coefficient.

Figures 6, 7:
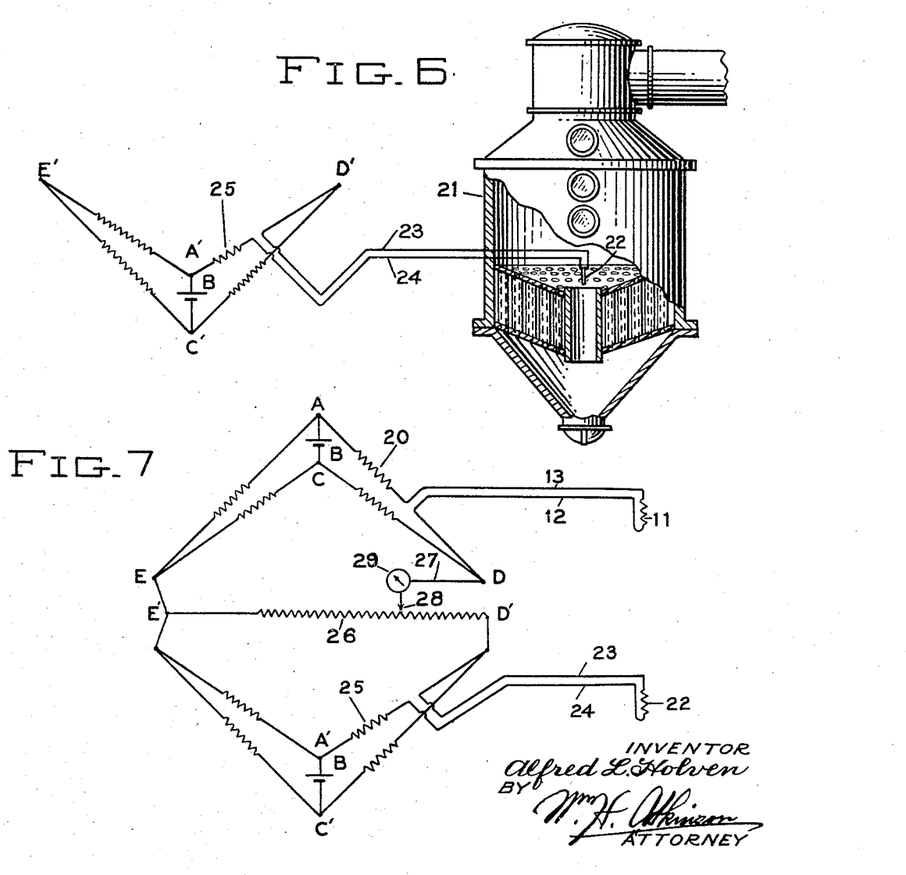
Figure 6 illustrates the principles of a system by which a potential difference proportional to the difference between the boiling point of the solution and a fixed or reference temperature can be obtained.
Figure 7 is a composite of the circuit features of Figures 5 and 6, illustrating how the ratio of the potential differences developed by each of said circuits may be determined.

In Figure 6 of the drawings, there is shown diagrammatically the arrangement by which it is possible to produce an electrical potential which is proportional to the expression "$Ts-k$" of the above simplified formula. In this arrangement the means and method is similar to that illustrated in Figure 5, insofar as the electrical circuit arrangement is concerned. As previously stated the expression "$Ts-k$" represents the difference between the boiling point of a sugar solution and a reference temperature "$k$". In this figure of the drawings, the numeral 21 designates a vacuum pan in which sugar liquor may be concentrated. Disposed within the vacuum pan 21 there is a resistance thermometer or other temperature responsive element 22 from which suitable leads 23 and 24 extend to a suitable circuit which forms a Wheatstone bridge. In this Wheatstone bridge A'E', E'C', C'D' and D'A' represent various resistances arranged in the form of a Wheatstone bridge. When the several arms of the bridge are connected, as illustrated, and appropriately adjusted in magnitude with respect to each other, the potential difference between the points D' and E' will be proportional to the quantity "$Ts-k$" of the above formula. In this instance, as is the case with the resistance thermometer element 11, the resistance element 22 is formed of copper, nickel, platinum or other material having a definite coefficient of resistance so that with all variations in temperature measured thereby a definite variation in its resistance will also take place. The resistances which comprise the arms A'E', E' C', C'D' and a resistance 25, which is connected in series with the thermometer resistance element 22, are made of manganin or other material having a negligible temperature coefficient. In this Wheatstone bridge circuit, as is also the case in the bridge circuit previously described in conjunction with the resistance thermometer element 11, there is shown between the points A and C and A' and C' a suitable battery B which serves to excite the bridge circuits and provide the potentials referred to. In practice it has been found practical and sufficient to locate the thermometer resistance element 22 in the center well of the vacuum pan 21. At this point a representative measure of the average temperature of the product being boiled may be obtained. Where the circulation of the boiling sugar liquor or massecuite is not sufficiently thorough, it has been found, however, that the thermometer resistance element 22 may give an abnormally high indication or value when the liquor within the vacuum pan rises to any considerable level above the thermometer. Such abnormally high readings have been found to be due to the hydrostatic head prevailing at the point where the thermometer resistance element 22 is located. To compensate for these abnormal readings in the vacuum pan 21, where the circulation is insufficient to permit a representative measurement of the temperature by means of a thermometer resistance element 22 located at a fixed point in the vacuum pan 21, it has been found desirable to locate the thermometer resistance element 22 so that it is at a point within the vacuum pan where a substantially unvarying hydrostatic head exists. Compensation for the effect of a varying hydrostatic head may be obtained either by mounting the thermometer resistance element 22 upon a float which will cause it to rise and fall with the level of the sugar liquor or massecuite within the vacuum pan, or by providing means by which a portion of the sugar liquor being concentrated may be elevated above the level of the main body of sugar liquor and discharged over an appropriately located thermometer resistance element 22. By the adoption of either of the above means the thermometer resistance element 22 will be located at all times in a zone of ebullition.

When the pilot pan 10 has been equipped, as above described, in connection with Figure 5 of the drawings, and provided with a resistance thermometer element 11 with the described bridge circuit and the sugar boiling vacuum pan 21 is equipped with the thermometer resistance element 22 and the connected bridge circuit, as described in connection with Figure 6 of the drawings, it will be possible by associating these two bridge circuits, in the manner illustrated in Figure 7 of the drawings, to determine the ratio $Tw-k$ over $Ts-k$ or tan. $\theta$ of the supersaturation line. In the circuit shown in Figure 7, now under consideration, the points E and E' of the two above described bridge circuits are connected together, and extending from these points there is a suitable slide wire resistance 26 which connects with the point D' of the vacuum pan bridge circuit. Extending from the point D of the pilot pan bridge circuit there is a conductor 27 having a sliding contact 28 which is adapted to slide along the slide wire resistance 26. In the circuit formed by the conductor 27 there is a suitable indicating instrument or galvanometer 29. In the circuit thus formed the electrical potential existing between the points D and E of the pilot pan bridge circuit is proportional to the numerator "$Tw-k$" and the electrical potential between the points D' and E' of the vacuum pan bridge circuit bears the same proportionality to the denominator $Ts-k$ of the above equation. Now if the sliding contact 28 is moved along the slide wire resistance 26 to a point where the galvanometer 29 gives a balanced reading, that proportion of the total resistance of the arm E'D' which is in the galvanometer circuit will be a direct measure of the tan. $\theta$ value or slope of the constant supersaturation line for the particular liquor under control. Therefore if the slide wire resistance 26 is properly calibrated it will be possible to read directly therefrom the supersaturation value of the boiling solution.

The basic circuit illustrated in Figure 7 of the drawings, is predicated upon the assumption that all constant supersaturation lines intersect at a common point, as illustrated in Figure 3 of the drawings. However, in view of the fact that the intersection point becomes increasingly more negative with higher supersaturation, in the manner illustrated in Figures 8 and 9 of the drawings, it has been found desirable to elaborate the above described circuit so as to automatically compensate for the fact that each supersaturation line has its own reference temperature or point of intersection with the zero supersaturation line.

While the above described circuit will produce results that will be of value, it has been found desirable, due to certain variables in the solution under treatment, to provide additional circuit features which will compensate for these variables. Before going into these additional features, however, attention will be directed to the graphs illustrated in Figures 8, 9, 10 and 11 of the drawings.

Figure 8:
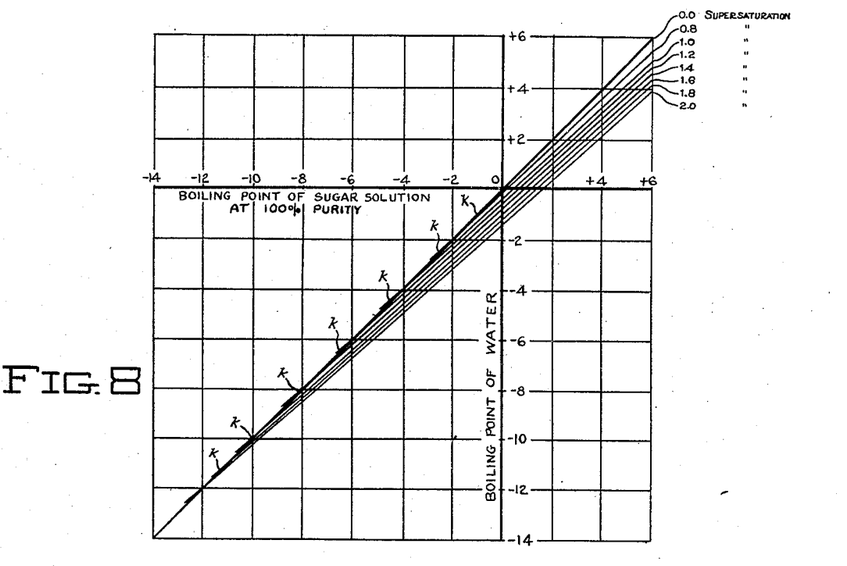
Figure 8 graphically shows on a magnified scale the extent to which the reference temperatures or intersection points for a pure sugar solution are dependent on the supersaturation value being measured.

Figure 8 of the drawings, illustrates on a magnified scale the extent to which the reference temperature, that is, the point at which the supersaturation line intersects the line representing zero supersaturation, is dependent on the supersaturation value being measured.

Figure 9:
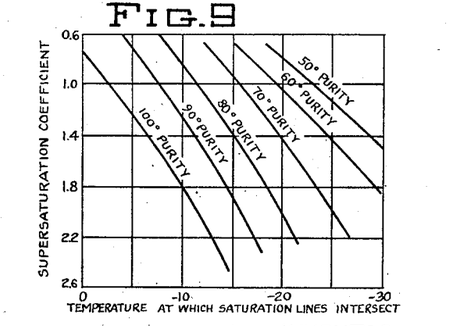
Figure 9 shows the reference temperatures or intersection points corresponding to various supersaturation curves for sugar liquors of different purities.

Figure 9 of the drawings, discloses the amount by which the intersection point or reference temperature is influenced, not only by the supersaturation of the solution, but also by the purity of the mother liquor. The lines here shown graphically represent the tan. $\theta$ values corresponding to various degrees of supersaturation. From these lines it will be obvious that the tan. $\theta$ value corresponding to any degree of supersaturation is dependent upon the purity of the mother liquor.

Figure 10:
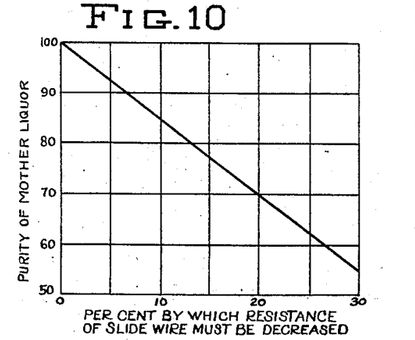
Figure 10 shows the extent to which the resistance of the supersaturation measuring slide wire must be decreased to compensate for the effect of purity of solution on the tan. $\theta$ value corresponding to any particular degree of supersaturation.

Figure 10 is a graph illustrating results of investigations which have shown that the amount by which the resistance of the arm E'D' of Figure 7 must be decreased, to compensate for changes in purity, is practically a linear function of the purity of the mother liquor.

Figure 11:
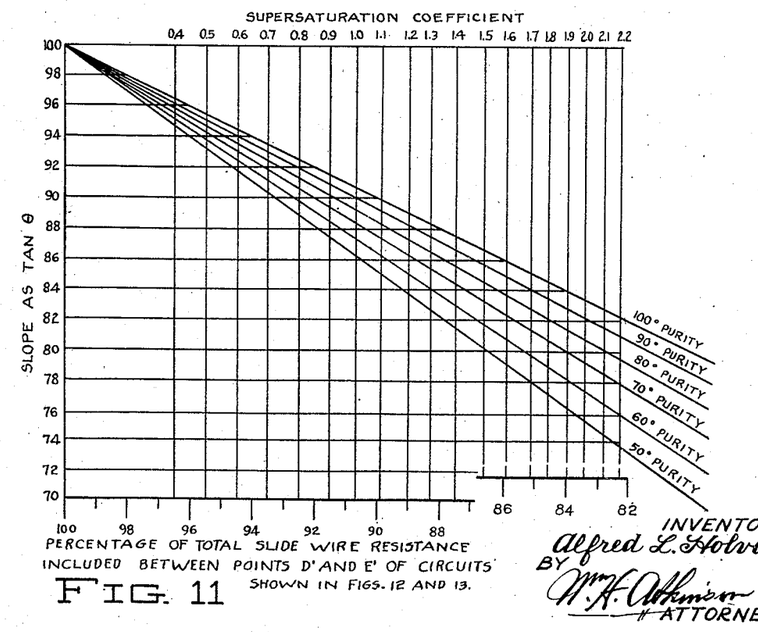
Figure 11 graphically illustrates the relationship between tan. $\theta$ values as ordinates and supersaturation slide wire calibrations as the upper abscissae for sugar liquors of various purities.

Figure 11 of the drawings, is included in this description to show the relationship which has been found to exist between the slide wire supersaturation calibrations and the tan. $\theta$ values for liquors of various purities. The lower abscissae in this graph represent the actual percentage of slide wire in the circuit between the points D' and E' of the circuits shown in Figures 12 and 13.

Figure 12:
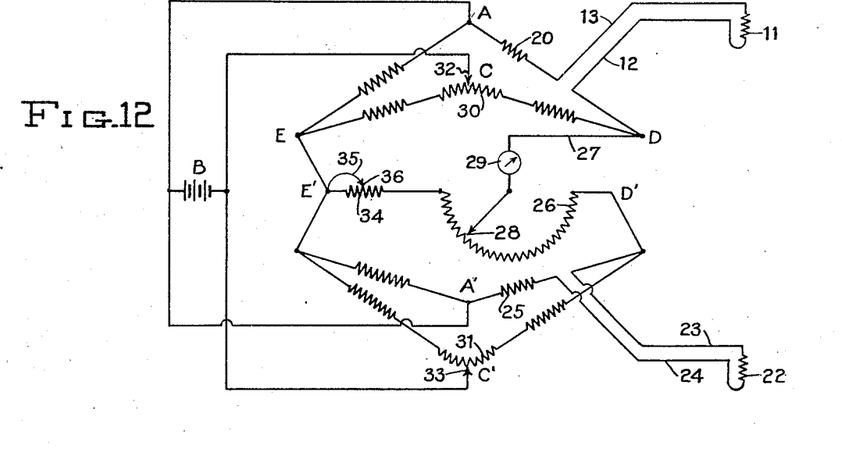
Figure 12 illustrates the circuits already shown in Figure 7, with additional features to include compensation for variables such as the influence of supersaturation and purity of the solution on the reference temperature and the effect of purity on the slide wire scale readings.

Upon referring to Figure 12 of the drawings, which as has been previously stated is an elaboration of the basic circuit illustrated in Figure 7 of the drawings, it will be seen that the pilot pan bridge circuit A, E, C, D and the vacuum pan bridge circuit A', E', C', D' are each excited from the same source of electrical potential, in this diagram the battery B. It will also be noted that in these bridge circuits at the points C and C', where the battery B connects, there are inserted slide wire resistances 30 and 31 having sliding contacts 32 and 33 respectively. These resistances 30 and 31 with their sliding contacts 32 and 33 provide means by which compensation may be made for the fact that each supersaturation line has its own reference temperature or point of intersection with the zero supersaturation line, as illustrated in Figure 8 of the drawings. By a simultaneous and equal movement of the sliding contacts 32 and 33 over their respective slide wire resistances 30 and 31, the relative resistances of the two adjacent arms of each of the two Wheatstone bridge circuits will be changed by the amounts required to compensate accurately for such deviation from the intersection point as is characteristic of the particular supersaturation being measured. For the purpose of appropriately decreasing the total resistance of the connection which includes the slide wire 26, as previously suggested, there is provided in series with the slide wire 26 a second slide wire resistance 34 with which a low resistance shunt 35 having a slidable contact 36 cooperates. With this arrangement it has been found possible to fully compensate for the influence of purity of the sugar liquor on the tan. $\theta$ value corresponding to the coefficient of supersaturation. As a further means to compensate for changes in the purity of the mother liquor, it has been found desirable to associate the slide wire resistances 26, 30 and 31 upon a common movable rotatable support and to also provide means whereby the sliding contacts 32 and 33 may be moved from a fixed position independently of said rotatable support. These latter aspects of the present invention will be more clearly pointed out in the description of the next figure of the drawings.

Figure 13:
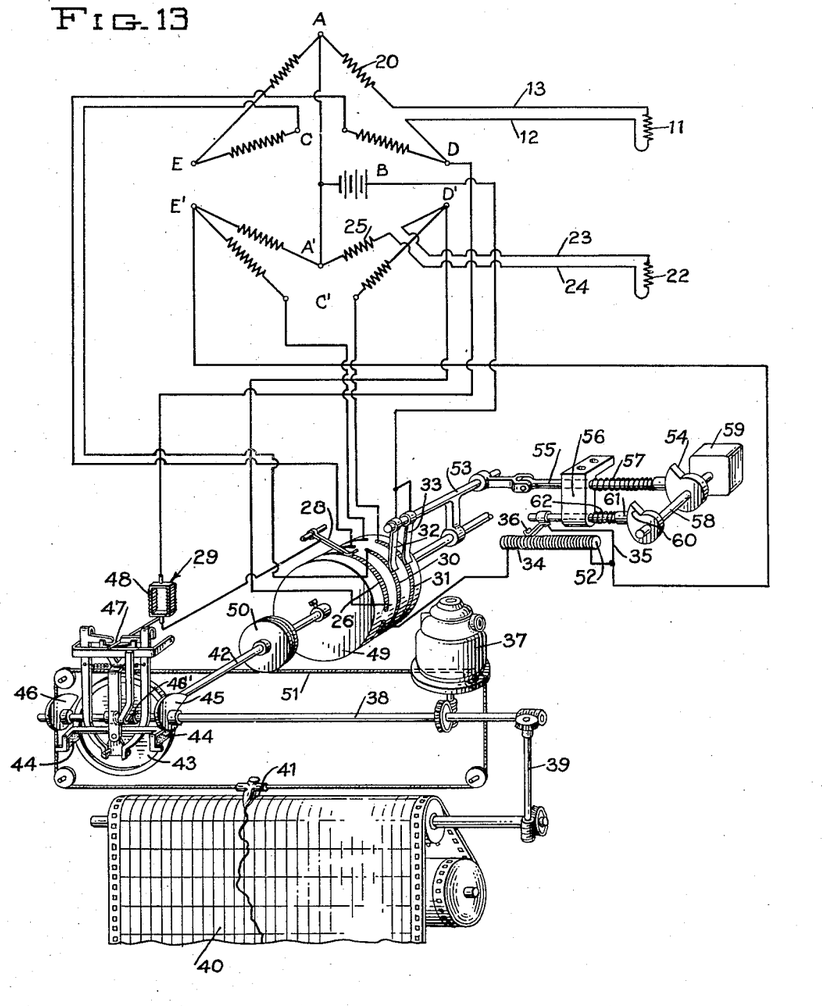
Figure 13 shows a schematic perspective of a mechanism by means of which supersaturation values of a solution can be automatically measured and recorded and also the circuits by means of which said results are obtained.

In Figure 13 of the drawings, the above multibridge circuit of Figure 12 is shown as connected to an automatic measuring and recording mechanism of the type illustrated and described in United States patent to Leeds, No. 1,125,699, dated January 19, 1915. The bridge balancing mechanism described in this patent is old and well known in the art and therefore a detailed description of its mode of operation is thought unnecessary. It will be sufficient for the purpose of the present description to state that the mechanism described by this prior patent comprises a continuously rotating constant speed motor 37 which is adapted to drive a shaft 38 and through a suitable worm and worm gear system 39, a recording chart 40 with which a tracing pen 41 cooperates. Disposed at a right angle to the shaft 38 and terminating adjacent one end, there is a second shaft 42 that has a frictional driving disc 43 with which pivotally mounted friction shoes 44 are adapted to cooperate when pressure is exerted thereupon by either one of two cams 45 and 46 which are carried by the motor driven shaft 38. The pivotally mounted friction shoes 44 are suspended upon a delicately mounted lever system that is adapted to be set in operation by a pointer or arm 47 which is moved by potential responsive winding 48 of the galvanometer 29. A cam 46' which is carried by the shaft 38 also operates in conjunction with the friction shoe supporting leverage, as will be well understood from the description of this apparatus given in the above referred to Leeds patent.

In this adaptation of the above identified automatic bridge balancing mechanism there is provided upon the shaft 42 a suitable insulating drum 49 about which the slide wire resistances 26, 30 and 31 are disposed, and for the purpose of controlling the movement of the tracing pen 41 there is also provided a pulley 50 about which is looped a continuous belt 51 that carries the tracing pen 41. With this arrangement it will be understood that the drum 49 will be rotated intermittently backward and forward as the galvanometer pointer 47 is deflected in one direction or another in response to an unbalance of the potential in the bridge system connected therewith.

As here shown the slide wire resistances 26, 30 and 31 are wrapped around the periphery of the drum 49 so that the cooperating sliding contacts may engage same as the drum 49 is moved. The second slide wire resistance 34, which has been referred to above as connected in series with the slide wire resistance 26, is shown as mounted in a stationary position upon a support 52 so that its sliding contact 36 may be moved thereover, as will hereinafter appear. In order to provide for the independent adjustment of the sliding contacts 32 and 33, as previously suggested, these sliding contacts are mounted upon an overhanging arm or support 53 which is affected by means of a cam 54 which acts through a sliding rod 55. The sliding rod 55 is supported upon a suitable bracket 56 and is biased at one end against the cam 54 by means of a spring 57. For this purpose the cam 54 is so designed and timed in its operation that it will complete a full or a fractional revolution during a certain interval of time, as for instance, during the course of a single strike, as used in sugar boiling parlance. The cam 54 is here shown as mounted upon a shaft 58 that is adapted to be rotated at the proper speed by a synchronous time keeping motor or clock mechanism 59. Mounted upon the shaft 58 there is also provided a second cam 60 which serves to move the sliding contact 36 of the low resistance shunt 35 over the slide wire resistance 34 to automatically compensate for predetermined changes in purity. This cam 60, like cam 54, is mounted upon the shaft 58 and is designed to impart movement to the contact 36 controlled thereby to compensate for the changes in the effect of the purity on the tan. $\theta$ value corresponding to any degree of supersaturation as the purity of the mother liquor changes during any predetermined interval of time.

In other words, the cam 60 serves as an index by which the calibrations of the supersaturation scale readings are automatically compensated to an extent corresponding with predetermined changes in purity. The cam 60 operates upon the sliding contact 36 of the slide wire resistance 34, which is in series with the supersaturation slide wire 26, through a thrust bar 61 which is also slidably mounted upon the bracket 56, the thrust bar 61 being biased at one end against the periphery of the cam 60 by means of a spring 62. Movement of the contact 36 over the resistance 34 serves to alter the resistance of the branch D'E' in which the slide wire resistance 26 is located. This cam 60 can be and is preferably designed to continuously shift the sliding contact 36 by such amounts as may be required to compensate for the effects of changes in purity of the mother liquor on the scale readings in accordance with the data presented in Figure 10 of the drawings.

The measurement of the coefficient of supersaturation by the combined action of the various components of the above described apapratus may be illustrated by a specific example. Assume that the equipment is being used for the measurement of the coefficient of supersaturation of a 100° purity sugar liquor boiling at 68.8° C., under an absolute pressure equivalent to six inches (6") of mercury. Under these conditions the resistance of the thermometer element 11 in the pilot pan 10 will assume a value corresponding to 60.6° C., which is the temperature at which the water in the pilot pan 10 will boil under absolute pressure equivalent to six inches (6") of mercury. As previously explained, the potential difference developed between the points D and E of the Wheatstone bridge in which the pilot pan thermometer element 11 is connected will be proportional of $Tw-k$. As $Tw$ in this particular case is equal to 60.6° C., and since by investigation, the results of which are shown in Figures 3 and 8 of the drawings, it has been found that the reference temperature corresponding to these particular conditions is —4.5° C., the expression "$Tw-k$" becomes equivalent to the algebraic difference of 60.6° C.—(—4.5° C.) or 65.1° C., which quantity is proportional to the potential difference developed between the points D and E of the pilot pan bridge circuit.

In a similar manner the potential difference developed between the points D' and E' of the vacuum pan bridge circuit, in which the resistance thermometer element 22 is connected, will be "$Ts-k$" or 68.8° C.—(4.5° C.) or 73.3° C., as $Ts$ is equal to 68.8° C. and "$k$", as previously mentioned, is equal to —4.5° C.

From the above it will be seen that the ratio $$\frac{Tw-k}{Ts-k} \text{ or } \frac{65.1}{73.3}$$

or approximately .89 is the tan. $\theta$ value corresponding to the existing degree of supersaturation. The value of the quontient $$\frac{Tw-k}{Ts-k}$$

which in this case is .89, governs the point at which the recording apparatus illustrated in Figure 13 of the drawings, will balance and as a result the degree of supersaturation corresponding to said tan. $\theta$ value will be measured and recorded in the manner disclosed below.

When the supersaturation slide wire resistance 26 of the combined bridge circuits is coiled about the rotatable drum 49 with the galvanometer 29 connected in series with the sliding contact 28 which engages the slide wire 26 and the position of the sliding contact 28 on the slide wire resistance 26 is not at the exact point representing the ratio to be measured, current will pass through the coil 48 of the galvanometer 29 and cause the pointer 47 of the galvanometer to deflect in either one direction or the other, depending on the nature of the unbalancing of the combined bridge circuit. Under these conditions the deflected galvanometer pointer 47 will be momentarily locked in a position which will place the friction shoes 44 in such a position that when the cams 45 and 46 upon the shaft 38 engage therewith, a turning movement will be imparted to the frictional driving disc 43 upon the shaft 42 and turn the drum 49 until the sliding contact 28 reaches the exact position on the slide wire resistance 26 which will balance the bridge circuit. At this point no current will flow through the galvanometer coil 48. When this happens the pointer 47 of the galvanometer 29 will assume its null or neutral position with respect to the leverage system which, as has been previously stated, forms the subject matter of the aforesaid Leeds patent.

In the assumed example, the point at which the sliding contact 28 will come to rest upon the slide wire resistance 26 will obviously be at 89% of the resistance included between the points D' and E' of the combined bridge circuit. If the slide wire resistance 26 is calibrated, as previously suggested, the sliding contact 28 will come to rest at a point at which 89% of the total resistance of the arm E' D' will be included between E' and the sliding contact 28. The value .89 then represents the tan. $\theta$ characteristic of the supersaturation being measured. From investigations, the results of which are summarized in Figure 11 of the drawings, it has been found that a tan. $\theta$ value of 0.89 for 100° purity sugar liquor represents a coefficent of supersaturation of 1.2, which as such will be the measurement or value recorded by the tracing pen 41 upon the moving chart 40. By reference to available tables and other necessary data, the coefficient of supersaturation of 100° purity sugar solution boiling at a temperature of 68.8° C. under an absolute pressure equivalent to six inches (6") of mercury, can be arithmetically calculated and said value will be found to be substantially identical with that obtained through automatic measurement by the means outlined above.

The operation of the above referred to compensating slide wire resistances 30 and 31 which correct for the extent to which "$k$", the reference temperature or intersection point changes, as shown in Figure 8 of the drawings, for various supersaturation values, will now be described. When the slide wire resistances 30 and 31 are mounted upon the rotatable drum 49, as illustrated in Figure 13 of the drawings, the respective cooperating sliding contacts 32 and 33 will for each position of the supersaturation slide wire resistance 26 introduce a corresponding readjustment in the position of the compensating slide wire resistances 30 and 31 with respect to their cooperating sliding contacts 32 and 33, and thereby accurately compensate for the extent to which the reference temperature changes as a function of the coefficient of supersaturation. In other words, by such means a reference temperature equivalent to —4.5° C. will be appropriately introduced into the combined bridge circuit at the moment at which the associated apparatus indicates a coefficient of supersaturation of 1.2

To further illustrate other features of this invention, there should be considered the conditions encountered when the mother liquor boiling at a temperature of 68.8° C. under a pressure of six inches (6") of mercury, has a 90° purity instead of a 100° purity. The decrease in the purity of the mother liquor to 90° in a predetermined interval of time will have been appropriately taken into account in the design of the cams 54 and 60, as previously described. For instance, from an inspection of Figure 10 of the drawings, it will be evident that the cam 60 should be so designed as to move the sliding contact 36 on the slide wire 34 a sufficient distance to reduce the total resistance between the points D' and E' of the vacuum pan bridge circuit by an amount equal to 6.8%. The aforementioned movement of contact 36 on slide wire 34 not only reduces the total resistance between D' E' to 100%—6.8% or 93.2% of its former value, but also moves the terminal or actual zero point of the measuring slide wire system, consisting of element 34 plus element 26, to a new point which is located, with respect to the original point E', a distance equivalent to 6.8% of the total resistance included between points D' and E'. By such means the effects of changing the purity of the mother liquor are so compensated for that the measured supersaturation values are brought into coincidence with the supersaturation calibration of slide wire 26.

From the above it will be evident that the cam 54 will have been designed to rotate the sliding contacts 32 and 33 over their related slide wire resistances 30 and 31 a sufficient distance to assume a position characteristic of the reference temperature corresponding to the conditions involved for a 90° purity sugar liquor which reference temperature will be approximately −7.5° C.

By similar means to those already outlined for a 100° purity solution, the various elements cooperate to measure, for the 90° purity, a tan. θ equivalent to $$\frac{60.6-(-7.5)}{68.8-(-7.5)}=.893.$$

In view of the facts that; first, the movement of contact 36 on slide wire 34 has reduced the resistance D' E' to 93.2% of the value it would have had if contact 36 had been located at the point E', and secondly, the contact 36 has shifted from the zero point to a new point which is distant by an amount equivalent to 6.8% of the total resistance D' E', the point assumed by contact 28 on slide wire 26 by the combined action of the various cooperating elements will be equal to (93.2%×.893)+6.8%=90.02%. By reference to the 90° purity calibrations of Figure 11, it will be found that a tan. θ of .893 and a percentage scale reading of 90.02% on slide wire 26 represent a supersaturation coefficient of 1.08. A calculation of the supersaturation having 90° purity sugar liquor will prove that the coefficient of 1.08 automatically measured by the above means is substantially exact.

From the foregoing description it will be evident that this invention offers a distinctly novel method and means of measuring the degree of supersaturation of a sugar solution by a system whose accuracy is unaffected by changes in the boiling temperature or the absolute pressure under which the sugar solution is being boiled. It will also be apparent that this invention constitutes a means of crystallizing sugar under controllable conditions and therefore represents a step far in advance of the previous methods of sugar boiling wherein reliance has of necessity been placed largely on the personal judgment and skill of the operator.

Certain terms used in the foregoing specifications are peculiar to the sugar industry and such terms will be defined. "Sugars" refers primarily to sucrose. By the term "purity" is meant the percentage of sucrose in the total dissolved solids. To say that a sugar liquor has a purity of 90° is equivalent to saying that 90% of the total solid matter present consists of sucrose. Purity is an index of quality and is independent of density. "Boiling point elevation" refers to the amount by which the boiling point of a solution at any absolute pressure exceeds the temperature of the solvent boiling under the same absolute pressure. "Coefficient of supersaturation" and "degree of supersaturation" are synonymous terms which have already been defined. In accordance with terminology generally employed in the sugar industry, they are applied to under-saturated as well as to supersaturated solutions.

In connection with the circuits illustrated herein, it is to be understood that the positions of the galvanometer and the source of electromotive force might be interchanged without affecting the principles or results involved. In lieu of the pilot pan 10, I may also employ other means for ascertaining the temperature at which the vapor pressure of water or other solvent exceeds the prevailing absolute pressure.

While in connection with this particular example of my invention I prefer to employ a null point potentiometric system for comparing the potentials developed across corresponding diagonals of the two Wheatstone bridges, it is to be understood that a differential galvanometer or other means of comparing such potentials might be employed, although such a substitution would not provide as perfect a system of measuring and controlling as that herein disclosed. Furthermore, other means by which the indications of a thermometric responsive element could be transformed into a potential, current, resistance or other value representative of the difference between the measured temperature and a reference temperature could be employed in lieu of the Wheatstone bridge circuit as illustrated. By suitable modifications in the circuit, it would be possible to employ thermocouples instead of resistance thermometers for securing the novel relationships above described. Such modifications fall within the scope of this invention.

The foregoing specifications have heretofore been devoted largely to a discussion of electrical means by which the ratio $$\frac{Tw-k}{Ts-k}=\tan.\ \theta$$

can be used to achieve a direct measure of the degree of supersaturation of a solution. However, it should be borne in mind that the application of the basic principles involved in this method of measuring supersaturation need not be confined merely to an electrical system, as it can be accomplished by other arrangements in which it is possible to produce two counteracting forces, one of which is proportional to the difference between the boiling point of the sugar liquor and a reference temperature, and the other of which is proportional to the difference between the boiling point of water and said reference temperature.

While I have shown and described this invention as applied particularly to the practice of sugar boiling, it is to be distinctly understood that it is not limited to this particular use. It is based broadly on a new discovery forming the basis of a method which consists of measuring and/or controlling the degree of supersaturation by determining the ratio of two quantities, one of which represents the difference between the boiling point of the solvent and a reference temperature, and the other of which represents the difference between the boiling point of the solution and said reference temperature. It is apparent that the principles involved may be applied to other evaporative processes in which it is desired to control the degree of supersaturation. Furthermore, while I have shown certain circuits and electrical control mechanisms, this invention is not limited to the exact arrangement as shown. It should be apparent that there are ways in which the circuits and associated apparatus could be rearranged to operate in a different manner and yet accomplish the same results. The specific form shown represents the preferred embodiment of the invention, but it is obvious that the novel principles fully disclosed herein may lead those skilled in the arts to other means and fields of application without departing from the spirit of this invention. It is therefore to be clearly understood that I do not limit myself to what is specifically shown in the drawings and described in the specifications, but as this invention is broadly new, it is desired to claim it as such so that all changes as come within the scope of the appended claims are to be considered as part of this invention.

Having thus described my invention, what I claim and desire to secure by Letters Patent is—

1. The method of determining the degree of supersaturation of a boiling solution which comprises determining the difference between the boiling point temperature of the solution at a definite absolute pressure and a reference temperature, said reference temperature being dependent upon the purity and supersaturation of the boiling solution, determining the difference between the temperature of boiling water at the same absolute pressure and said reference temperature, and finally determining the ratio between said above temperature differences as an indication of the degree of supersaturation of the boiling solution.

2. The method of determining the degree of supersaturation of a solution undergoing concentration, which comprises determining a numerical quantity proportional to the difference between the temperature of a solution boiling at any absolute pressure and a reference temperature, which reference temperature is the point at which a plotted line for the solution at a given supersaturation using the boiling point of the solvent as ordinates and the boiling point of the solution as abscissa intersects a similarly plotted line representing zero supersaturation for said solution, determining a numerical quantity proportional to the difference between the temperature of the solvent of said solution boiling at the same absolute pressure and said reference temperature, and finally determining the ratio between said numerical quantities as an indication of the degree of supersaturation of the solution.

3. A method of determining the degree of supersaturation of a boiling solution, which comprises the determination of a numerical value proportional to the difference between the temperature of a solution boiling at any absolute pressure and a reference temperature which is dependent upon the point at which a plotted line for the solution at a given supersaturation and purity intersects a plotted line for the same solution at zero supersaturation, determining a numerical value proportional to the difference between the temperature of the solvent of said solution boiling at the same absolute pressure and said reference temperature, and finally determining the ratio between said numerical values as an indication of the degree of supersaturation.

4. The method of determining the degree of supersaturation of a boiling solution in accordance with the formula:

$$\frac{Tw - K}{Ts - K} = \tan \theta$$

wherein:
 $Tw$ = the temperature of a boiling solvent of the solution at the same absolute pressure as the boiling solution,
 $Ts$ = the temperature of the boiling solution,
 $K$ = a reference temperature determined by the point at which a constant supersaturation line for the solution plotted with reference to the boiling point of water as ordinates and the boiling point of the solution as abscissa intersects a line similarly plotted for the solution at zero supersaturation, and
 Tan. $\theta$ is representative of the coefficient of supersaturation of the boiling solution.

5. The method of electrically determining the degree of supersaturation of a boiling solution, which comprises producing an electrical potential dependent upon the temperature of a boiling solution, producing a second electrical potential dependent upon the temperature of the boiling solvent of said solution, introducing into each of said potentials a voltage change dependent upon a temperature value determined by the point at which a supersaturation line for the solution intersects a line representing zero supersaturation, and finally determining the ratio between the resulting potentials as a measure of the degree of supersaturation of the solution.

6. A method of determining the degree of supersaturation of a boiling sugar solution which comprises producing an electrical quantity proportional to the difference between the temperature of water boiling at the prevailing absolute pressure and a reference temperature, said reference temperature being determined by the point at which a supersaturation line for the sugar solution intersects a line representing zero supersaturation, and producing another electrical quantity proportional to the difference between the temperature of the boiling sugar solution at the prevailing absolute pressure and said reference temperature, and determining electrically the ratio between said electrical quantities as an indication of the degree of supersaturation.

7. A method of determining the degree of supersaturation of a solution which comprises producing an electrical quantity or measurable value which is proportional to the difference between the temperature of a solvent having a vapor pressure equal to the prevailing absolute pressure and a reference temperature, said reference temperature being determined by the point at which a supersaturation line for the solution intersects a line representing zero supersaturation, and producing another electrical quantity or measurable value which is proportional to the difference between the temperature of a solution having a vapor pressure equal to the prevailing absolute pressure and said reference temperature, and finally determining electrically the ratio between said electrical quantities or measurable values as an indication of the degree of supersaturation.

8. A method of determining the degree of supersaturation of a boiling sugar solution which comprises producing an electrical quantity or measurable value which is proportional to the difference between the temperature of water having a vapor pressure equal to the prevailing absolute pressure and a reference temperature, said reference temperature being determined by the point at which a line for a solution of known supersaturation plotted against the boiling point of water as ordinates and the boiling point of sugar solution of known purity as abscissa intersects a line similarly plotted for the same solution at zero supersaturation, and producing another electrical quantity or measurable value which is proportional to the difference between the temperature of a sugar solution having a vapor pressure equal to the prevailing absolute pressure and said reference temperature, and finally determining the ratio between said electrical quantities or measurable values as an indication of the degree of supersaturation.

9. The method of determining the degree of supersaturation of a boiling solution which comprises producing a potential value representative of the departure of the temperature of a boiling solvent of the solution from a reference temperature, which reference temperature is dependent upon the supersaturation and purity of the boiling solution, producing a second potential value representative of the departure of the temperature of the boiling solution from said reference temperature, and opposing said potential values to each other to determine the ratio of one of said potentials to the other as an indication of the degree of supersaturation of the solution.

10. The method of determining the degree of supersaturation of a boiling solution from the temperatures existing in a boiling solvent and the boiling solution, which comprises determining a value representative of the departure of the temperature of the boiling solution from a reference temperature, said reference being determined by the point at which a supersaturation line for the solution intersects a line representing zero supersaturation, determining a second value representative of the departure of the temperature of the boiling solvent from said reference temperature, and finally determining the ratio between said first and second values as a measure of the degree of supersaturation of the solution.

11. In a system for electrically determining the degree of supersaturation of a boiling solution, the combination of an electrical temperature responsive circuit adapted to produce a potential representative of the temperature of a boiling solution, a second electrical temperature responsive circuit adapted to produce a potential representative of the temperature of a boiling solvent of said solution, means associated with each of said electrical temperature responsive circuits for introducing a voltage change in the potentials produced thereby which voltage change is determined by the supersaturation and purity of the boiling solution, and means connected between said electrical temperature responsive circuits for determining the ratio between the resulting potentials as a measure of the degree of supersaturation of the boiling solution.

12. In a system for electrically indicating the degree of supersaturation of a boiling solution, the combination of an electrical temperature responsive circuit adapted to produce a potential representative of the temperature of a boiling solution, a second electrical temperature responsive circuit adapted to produce a potential representative of the temperature of a boiling solvent of said solution, means associated with each of said electrical temperature responsive circuits for introducing a voltage change in the potentials produced thereby which change is determined by the supersaturation of the boiling solution, a resistance means variable throughout the boiling cycle for introducing an additional voltage change in said potentials as determined by the changing purity of the solution, and means connected between said electrical temperature responsive circuits responsive to the ratio between the resulting potentials to indicate the degree of supersaturation of the boiling solution.

13. In a system for indicating the degree of supersaturation of a boiling solution, the combination of a vacuum pan in which the solution under control is boiled, a pilot pan connected to said vacuum pan in which the solvent of the boiling solution is boiled, said vacuum pan and said pilot pan being operative at the same degree of absolute pressure, a thermosensitive bridge circuit associated with said vacuum pan adapted to produce a potential proportional to the difference between the temperature existing within said vacuum pan and a reference temperature dependent upon the supersaturation and purity of the solution, a second thermosensitive bridge circuit associated with said pilot pan and adapted to produce a potential proportional to the difference between the temperature existing within said pilot pan and said reference temperature, means associated with said thermosensitive bridge circuits for determining the ratio between the potentials produced thereby, and means responsive to said last means for indicating the degree of supersaturation of the solution boiling in said vacuum pan.

14. In a system for determining the degree of supersaturation of a boiling solution, the combination of a vacuum pan in which the solution is boiled, a pilot pan connected to said vacuum pan in which the solvent of the boiling solution is boiled, said vacuum pan and said pilot pan being operative at the same degree of absolute pressure, a thermosensitive circuit associated with said vacuum pan adapted to produce a potential proportional to the difference between the temperature existing within said vacuum pan and a reference temperature dependent upon the supersaturation and purity of the solution, a second thermosensitive circuit associated with said pilot pan and adapted to produce a potential proportional to the difference between the temperature existing within said pilot pan and said reference temperature, means associated with said thermosensitive circuits responsive to the ratio between said potentials, and an indicating means associated with said last means adapted to indicate the degree of supersaturation of the solution under treatment in said vacuum pan.

15. A system for electrically determining the degree of supersaturation of a boiling solution, comprising a circuit consisting of two Wheatstone bridges energized from a common source of electromotive force, a resistance in one of said bridges variable in accordance with the boiling point of a solvent, a resistance in a corresponding position of the other of said bridges variable in accordance with the boiling point of a solution, a resistance connected across terminals of said latter bridge, and a galvanometer in a connection between a terminal of said first bridge and a point variable along said resistance, said latter resistance being calibrated in terms of supersaturation.

16. A system for electrically determining the degree of supersaturation of a boiling sugar solution, comprising a circuit consisting of two Wheatstone bridges energized from a common source of electromotive force, a resistance in one of said bridges variable in accordance with the boiling point of water, a resistance in a corresponding position of the other of said bridges variable in accordance with the boiling point of a sugar solution, a resistance connected between the terminals of said other bridge, and a galvanometer in a connection between a terminal of the first of said bridges and a point variable along said latter resistance, said latter resistance being calibrated in terms of supersaturation.

17. A system for electrically determining the degree of supersaturation of a boiling solution, comprising a circuit consisting of two Wheatstone bridges energized from a common source of electromotive force, a resistance in one of said bridges variable in accordance with the boiling point of water at the prevailing absolute pressure, a resistance in a corresponding position of the other of said bridges variable in accordance with the boiling point of a solution at the same absolute pressure, a resistance connected between the terminals of one of said Wheatstone bridges, and a galvanometer in a connection between a terminal of the other of said bridges and a point variable along said latter resistance, said latter resistance being calibrated in terms of supersaturation.

18. A system for electrically determining the degree of supersaturation of a boiling solution, comprising a circuit consisting of two energized Wheatstone bridges, a resistance in one of said bridges variable in accordance with the boiling point of water at the prevailing absolute pressure, a resistance in a corresponding position of the other of said bridges variable in accordance with the boiling point of a solution at the same absolute pressure, a resistance connected between the terminals of one of said Wheatstone bridges, and a galvanometer in a connection between a terminal of the other of said bridges and a point variable along said latter resistance, said latter resistance being calibrated in terms of supersaturation.

19. A system for determining the degree of supersaturation of a boiling solution comprising a circuit consisting of two Wheatstone bridges energized from a common source of electromotive force, a resistance in one of said bridges variable in accordance with the boiling point of water, a resistance in a corresponding position in the other of said bridges variable in accordance with the boiling point of the solution, a connection between said bridges having a potentiometer resistance therein, and a galvanometer in said connection for indicating the condition of balance or unbalance between the potentials developed by said Wheatstone bridges.

20. A system for determining the degree of supersaturation of a boiling solution comprising a circuit consisting of two Wheatstone bridges energized from a common source of electromotive force, a resistance in one of said bridges variable in accordance with the boiling point of water, a resistance in a corresponding position in the other of said bridges variable in accordance with the boiling point of the solution, a connection between corresponding points on both of said bridges and an opposite point on one of said bridges having a potentiometer resistance therein, a connection from a point variable along said potentiometer resistance and an opposite point upon the other of said bridges, and a galvanometer in said last connection for indicating the condition of balance between said Wheatstone bridges.

21. A system for determining the degree of supersaturation of a boiling solution comprising a circuit consisting of two Wheatstone bridges energized from a common source of electromotive force, a resistance in one of said bridges variable in accordance with the boiling point of water, a resistance in a corresponding position in the other of said bridges variable in accordance with the boiling point of the solution, a connection between corresponding points on both of said bridges and an opposite point on one of said bridges having a calibrated potentiometer resistance therein, a connection from a point variable along said potentiometer resistance and an opposite point upon the other of said bridges, and a galvanometer in said last connection for indicating the condition of balance between said Wheatstone bridges, the calibration of said potentiometer resistance being in terms of degrees of supersaturation.

22. In a system for determining the degree of supersaturation in a boiling solution, comprising a circuit consisting of two Wheatstone bridges energized from a common source of electromotive force, a resistance variable in accordance with the boiling point of water connected in one arm of one of said Wheatstone bridges, a resistance variable in accordance with the boiling point of a solution connected in a corresponding position in the other of said Wheatstone bridges, a second resistance in each of said Wheatstone bridge circuits connected between the corresponding arms of each of said bridge circuits, and a variable connection between a point intermediate the ends of said latter resistances and the source of energization, whereby the resistance ratios of the arms adjacent each of said second resistances in each of said bridge circuits may be simultaneously changed to compensate for the dependence of a reference temperature on the supersaturation value.

23. In a system of control for determining the degree of supersaturation of a boiling solution, the combination of a Wheatstone bridge circuit, having a thermosensitive potential controlling element in one arm thereof adapted to be disposed in a sugar boiling vacuum pan, a second bridge circuit having a thermosensitive potential controlling element disposed in a pilot pan operating at the same absolute pressure as said vacuum pan, a galvanometer connected between said bridge circuits to indicate a condition of balance therebetween, a variable resistance in each of said bridge circuits and in said galvanometer circuit, and means responsive to said galvanometer for simultaneously controlling the value of said variable resistances to effect an electrical balance between said bridge circuits.

24. In a system of control for determining the degree of supersaturation of a boiling solution, the combination of a Wheatstone bridge circuit, having a thermosensitive potential controlling element in one arm thereof adapted to be disposed in a sugar boiling vacuum pan, a second bridge circuit having a thermosensitive potential controlling element disposed in a pilot pan operating at the same absolute pressure as said vacuum pan, a galvanometer connected between said bridge circuits to indicate a condition of balance therebetween, a variable resistance in each of said bridge circuits and in said galvanometer circuit, means responsive to said galvanometer for controlling the value of said variable resistances to effect an electrical balance between said bridge circuits, and means controlled by said last means for indicating the adjustment effected in said variable resistance as an indication of the degree of supersaturation of the boiling solution.

25. In a system for determining the degree of supersaturation of a boiling solution, comprising a circuit consisting of two Wheatstone bridges energized from a common source of electromotive force, a resistance variable in accordance with the boiling point of water connected in one arm of one of said Wheatstone bridges, a resistance variable in accordance with the boiling point of a solution connected in a corresponding position in the other of said Wheatstone bridges, a second resistance in each of said Wheatstone bridge circuits connected between the corresponding arms of each of said bridge circuits, and a variable connection between a point intermediate the ends of said latter resistances and the source of energization, whereby the resistance ratios of the arms adjacent each of said second resistances in each of said bridge circuits may be simultaneously changed to compensate for the dependence of a reference temperature on the degree of supersaturation for a given purity of the mother liquor.

26. In a system for determining the degree of supersaturation of a boiling sugar solution, comprising a circuit consisting of two Wheatstone bridges energized from a common source of electromotive force, a resistance variable in accordance with the boiling point of water connected in one arm of one of said Wheatstone bridges, a resistance variable in accordance with the boiling point of a solution connected in a corresponding position in the other of said Wheatstone bridges, a second resistance in each of said Wheatstone bridge circuits connected between the corresponding arms of each of said bridge circuits, a contact engaging a point intermediate the ends of said latter resistances and connecting said points to a source of electromotive force, whereby the resistance ratios of the arms adjacent each of said second resistances in each of said bridge circuits may be simultaneously changed to compensate for the dependence of a reference temperature on the degree of supersaturation of the solution, and a second means for effecting a change in the point of engagement of said contact with said latter resistances to compensate for the dependence of the reference temperature upon the purity of the mother liquor.

27. In a system of the character described for determining the degree of supersaturation of a boiling solution, the combination of a plurality of Wheatstone bridge circuits each having variable resistances in corresponding positions to compensate for the dependence of a reference temperature on the degree of supersaturation, said resistances being movable with respect to circuit making contacts which engage points intermediate the ends of said resistances as determined by the degree of supersaturation of the solution, and means for moving said contacts independently of the movement of said resistances to compensate for the dependence of the reference temperature on the purity of the mother liquor.

28. In a system of the character described for determining the degree of supersaturation of a boiling sugar solution, the combination of a Wheatstone bridge circuit for producing a potential which is proportional to the difference between the temperature of the boiling solution and a reference temperature at a definite absolute pressure, a second Wheatstone bridge circuit for producing a potential which is proportional to the difference between the temperature of a boiling solvent and a reference temperature at the same absolute pressure, each of said bridge circuits having a variable resistance in a corresponding position to compensate for the dependence of the reference temperature on the degree of supersaturation, said resistances being movable with respect to circuit making contacts which engage points intermediate the ends of said resistances as determined by the degree of supersaturation of the solution, and means for simultaneously moving said contacts independently of the movement of said resistances to further compensate in each of said bridge circuits for the dependence of the reference temperature on the purity of the mother liquor.

29. In a system of the character described for determining the degree of supersaturation of a boiling solution, the combination of a plurality of Wheatstone bridge circuits having a potentiometer winding connected therebetween for determining the ratio between the potentials developed in each of said Wheatstone bridge circuits, and means for changing the total resistance value of said potentiometer winding to compensate for the dependence of the supersaturation value on the purity of the boiling solution.

30. In a system of the character described for determining the degree of supersaturation of a boiling solution, the combination of a plurality of Wheatstone bridge circuits, a variable potentiometer resistance in a connection between corresponding terminals on each of said bridge circuits and an opposite terminal on one of said bridge circuits, a connection between the opposite terminal on the other of said bridge circuits and a point intermediate the ends of said potentiometer resistance, and variable resistance in series with said potentiometer resistance, and means for changing the value of said last resistance over a predetermined cycle to compensate for the effect of purity of the mother liquor on the supersaturation values as indicated by the position of the connection between the opposite terminal of the other of said Wheatstone bridge circuits and the point intermediate the ends of said potentiometer resistance.

ALFRED L. HOLVEN.